United States Patent
Saito et al.

(10) Patent No.: US 8,520,167 B2
(45) Date of Patent: Aug. 27, 2013

(54) LIQUID CRYSTAL DISPLAY DEVICE

(75) Inventors: Shinji Saito, Kanagawa (JP); Yasushi Hattori, Kanagawa (JP); Shinya Nunoue, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 225 days.

(21) Appl. No.: 13/038,728

(22) Filed: Mar. 2, 2011

(65) Prior Publication Data

US 2012/0002137 A1 Jan. 5, 2012

(30) Foreign Application Priority Data

Jul. 1, 2010 (JP) ................. 2010-150743

(51) Int. Cl.
*G02F 1/1335* (2006.01)
*F21V 7/00* (2006.01)
*F21V 11/00* (2006.01)

(52) U.S. Cl.
USPC ............... 349/71; 349/64; 362/297; 362/347; 362/355

(58) Field of Classification Search
USPC ............... 349/64, 70, 71, 113; 362/241, 297, 362/341, 347, 348, 350, 355, 356, 361
See application file for complete search history.

(56) References Cited

U.S. PATENT DOCUMENTS

| | | | |
|---|---|---|---|
| 7,172,328 B2 * | 2/2007 | Hoelen et al. ............. | 362/610 |
| 2007/0035967 A1 | 2/2007 | Song | |
| 2007/0236927 A1 | 10/2007 | Liu | |
| 2008/0055515 A1 | 3/2008 | Ha et al. | |
| 2009/0040787 A1 | 2/2009 | Nagata et al. | |
| 2009/0185589 A1 | 7/2009 | Hattori et al. | |
| 2010/0053992 A1 * | 3/2010 | Krijn et al. ............. | 362/606 |
| 2011/0199686 A1 | 8/2011 | Fujisawa | |

FOREIGN PATENT DOCUMENTS

| | | |
|---|---|---|
| JP | 2001-512248 A | 8/2001 |
| JP | 2005-24924 | 1/2005 |
| JP | 2005-38747 | 2/2005 |
| JP | 2006-350178 A | 12/2006 |
| JP | 2007-41605 | 2/2007 |
| JP | 2008-20231 A | 1/2008 |
| JP | 2008-58949 A | 3/2008 |
| JP | 2009-64775 A | 3/2009 |
| WO | WO 2010/047089 A1 | 4/2010 |

OTHER PUBLICATIONS

Office Action issued Apr. 24, 2012, in Japanese Patent Application No. 2010-150743 with English translation.
U.S. Appl. No. 12/876,675, filed Sep. 7, 2010, Yasushi Hattori, et al.
U.S. Appl. No. 12/876,774, filed Sep. 7, 2010, Masaki Tohyama, et al.
Japanese Office Action issued Oct. 2, 2012 in Patent Application No. 2010-150743 with English Translation.

* cited by examiner

*Primary Examiner* — Mark Robinson
*Assistant Examiner* — Robert Tavlykaev
(74) *Attorney, Agent, or Firm* — Oblon, Spivak, McClelland, Maier & Neustadt, L.L.P.

(57) ABSTRACT

A liquid crystal display device of an embodiment has: a semiconductor laser diode emitting a first laser beam; a first reflecting unit configured to reflect the first laser beam and form a second laser beam having a one-dimensionally spread distribution; and a second reflecting unit configured to reflect the second laser beam and form a third laser beam having a two-dimensionally spread distribution. The device also has: an optical switch using liquid crystal, the optical switch being configured to control passage and blocking of the third laser beam; and a first scattering unit scattering the third laser beam.

22 Claims, 6 Drawing Sheets

LIQUID CRYSTAL DISPLAY DEVICE

CROSS-REFERENCE TO RELATED APPLICATION

This application is based upon and claims the benefit of priority from Japanese Patent Application No. 2010-150743, filed on Jul. 1, 2010, the entire contents of which are incorporated herein by reference.

FIELD

Embodiments described herein relate generally to a liquid crystal display device.

BACKGROUND

There is a technique of applying an LED as a light source of a backlight of a liquid crystal display device. The technique is directed to lower the power consumption by replacing a conventional cold-cathode tube with an LED.

Even in the case of using an LED as a light source, a light quantity loss occurs in a polarizer of a liquid crystal optical switch and a color filter. Consequently, the LED does not always have higher efficiency of use of light generated from the light source as compared with the cold-cathode tube, and reduction amount of power consumption is not so large.

DETAILED DESCRIPTION

A liquid crystal display device of an embodiment has: a semiconductor laser diode emitting a first laser beam; a first reflecting unit configured to reflect the first laser beam and form a second laser beam having a one-dimensionally spread distribution; and a second reflecting unit configured to reflect the second laser beam and form a third laser beam having a two-dimensionally spread distribution. The device also has: an optical switch using liquid crystal, the optical switch being configured to control passage and blocking of the third laser beam; and a first scattering unit scattering the third laser beam.

Embodiments will be described below with reference to the drawings.

First Embodiment

A liquid crystal display device of an embodiment has: a semiconductor laser diode for emitting a first laser beam; a first reflecting unit for reflecting the first laser beam to form as a second laser beam having a one-dimensionally spread distribution; a second reflecting unit for reflecting the second laser beam to form a third laser beam having a two-dimensionally spread distribution; a liquid crystal optical switch on which the third laser beam falls; and a first scattering unit on which the third laser beam passed through the liquid crystal optical switch falls and which generates scattered light.

In the liquid crystal display device of the embodiment, by having the above configuration, while maintaining polarization of a laser beam emitted from a semiconductor laser diode (LD) as a light source, light is transmitted to the liquid crystal optical switch. Therefore, the light quantity loss in the polarizer of the liquid crystal optical switch becomes extremely small, and power consumption of the device is reduced.

Figure 1A:
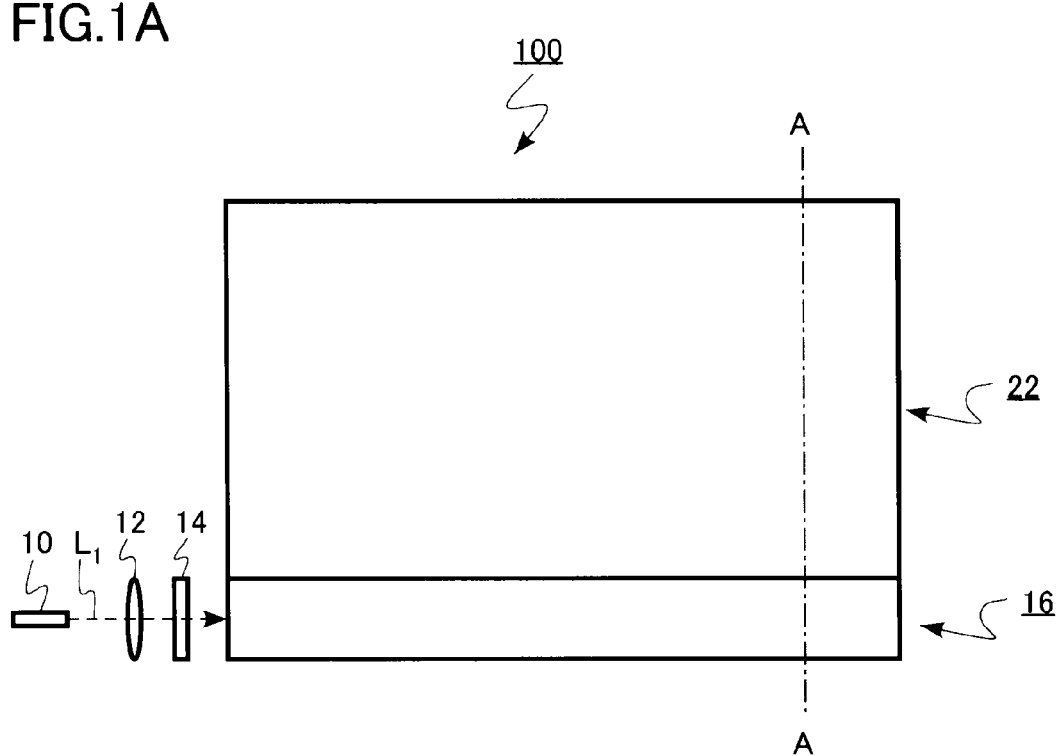
FIGS. 1A to 1C are schematic diagrams of a liquid crystal display device of a first embodiment.
Figure 1B:
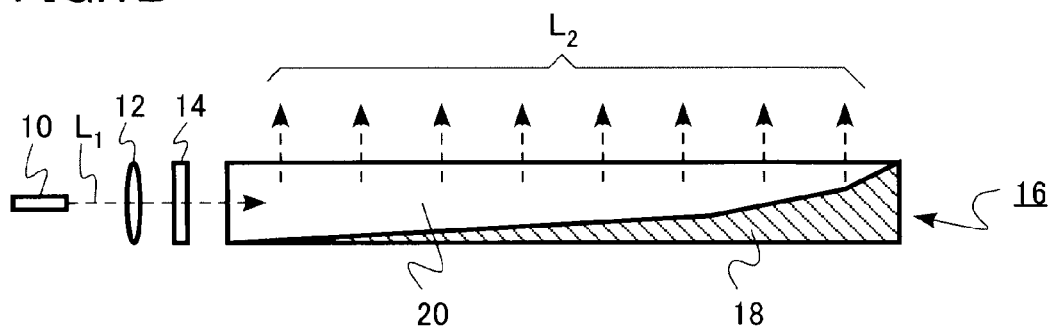
Figure 1C:
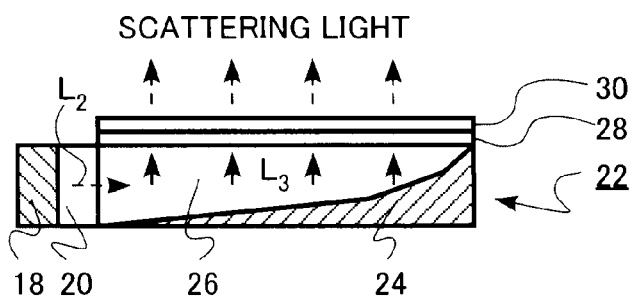

FIGS. 1A to 1C are schematic diagrams of a liquid crystal display device of the first embodiment. FIG. 1A is a schematic top view of the liquid crystal display device, FIG. 1B is a schematic cross section of a plane parallel to the top view of FIG. 1A of a first reflecting unit and the like, and FIG. 1C is a schematic cross section taken along line A-A of FIG. 1A. In the specification, for convenience, the display face side of the liquid crystal display device will be called the top face of the liquid crystal display device.

A liquid crystal display device 100 has a semiconductor laser diode 10 as a light source. And the semiconductor laser diode 10 emits a first laser beam $L_1$. The semiconductor laser diode 10 is a point light source for emitting laser beams aligned in the polarization direction. In the following, the case where the first laser beam $L_1$ is ultraviolet light having a wavelength λ of, for example, 400 nm will be described.

To increase the brightness of the display face of the liquid crystal display device 100, as the semiconductor laser diode 10, for example, it is desirable to use a semiconductor laser diode of high output such as a wide-stripe semiconductor laser diode with a ridge waveguide.

The liquid crystal display device 100 has a collimator lens 12 for making the first laser beam $L_1$ parallel light in the emission direction of the first laser beam $L_1$, and a diffraction grating 14 for uniformizing the light quantity distribution of the first laser beam $L_1$. On the collimator lens 12, desirably, nonreflecting coating for the wavelength $L_1$ of the first laser beam is performed in order to suppress the light quantity loss by surface reflection. To the diffraction grating 14, for example, a diffraction-type homogenizer made by JENOPTIK Laser, Optik, Systeme GmbH can be applied.

The liquid crystal display device 100 also has a first reflecting unit 16 for reflecting the first laser beam $L_1$ and forming a second laser beam $L_2$ having a one-dimensionally spread distribution, that is, having a linear distribution. The first reflecting unit 16 is constructed by a first reflector 18 having a reflection face and a first transparent unit 20 provided on the reflection face of the first reflector 18. The first reflector 18 expands in the emission direction of the first laser beam $L_1$. The first laser beam $L_1$ is reflected by the first reflecting unit 16 while maintaining the wavelength and polarization to become the second laser beam $L_2$.

The material of the first reflector 18 is, for example, molded glass, and the surface on which the first laser beam $L_1$ falls is a reflection face coated with a metal having high reflectance to the first laser beam $L_1$ such as Al or Ag. The material of the first reflector 18 is not limited to glass but may be a resin or metal.

A single-layer or multi-layer dielectric film for increasing the reflectance may be formed by vapor deposition or the like on the surface of the reflector. The optical thickness of the dielectric film is desirably mλ/4n when the wavelength of the first laser beam $L_1$ is $\lambda$ from the viewpoint of increasing the reflectance. "m" denotes an integer, and "n" denotes a refractive index of the dielectric film. For the dielectric film, for example, $SiO_2$, $ZrO_2$, $TiO_2$, or the like can be used.

The first transparent unit 20 is, for example, a transparent glass made of a transparent resin, quartz, or the like and is processed so as to be fit to the reflection face of the first reflector 18. The end face on the semiconductor laser diode 10 side of the first transparent unit 20 is desirably subjected to non-reflection coating for the wavelength of the first laser beam $L_1$ in order to suppress the light quantity loss by surface reflection. Alternatively, the end face is tilted with respect to the first laser beam $L_1$ so that the angle becomes the Brewster's angle.

Preferably, the first transparent unit 20 assures the intensity of the first reflecting unit 16 and, from the viewpoint of facilitating manufacture, the first transparent unit 20 exists. From the viewpoint of optical characteristics, the first transparent unit 20 is not always an essential component, and the reflection face side of the first reflecting unit 16 may be gas such as air.

Figure 2:
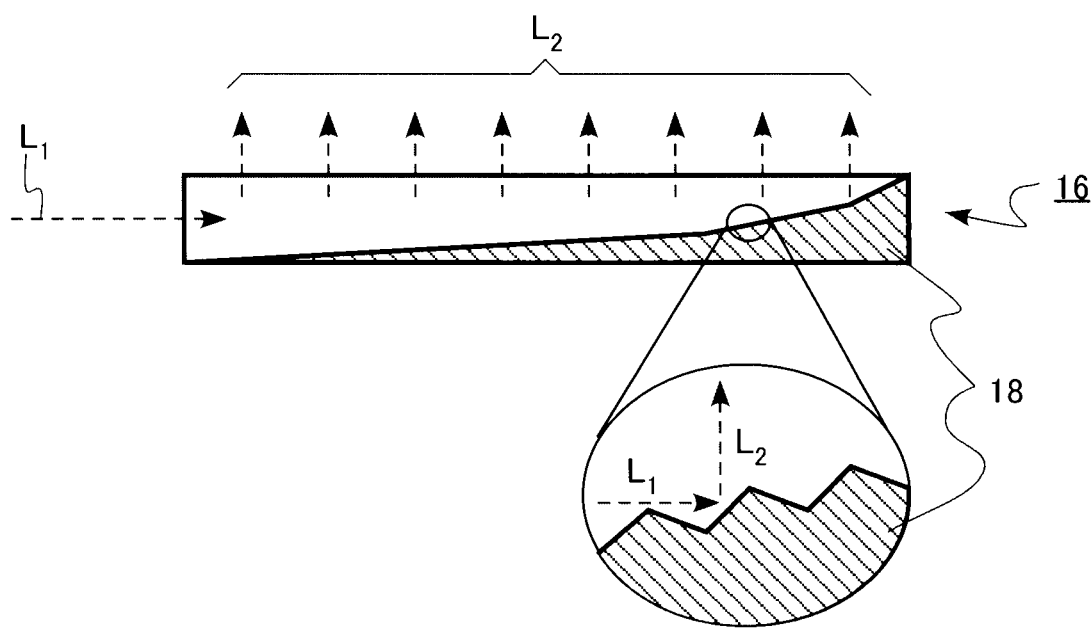
FIG. 2 is a partly enlarged view of a portion around a reflection face of a first reflector in the first embodiment.

FIG. 2 is a partly enlarged view of a portion around a reflection face of a first reflector in the first embodiment. The reflection face of the reflector 18 is desirably formed by combination of planes and has, for example, an uneven shape such as a triangle as shown in FIG. 2. By optimizing the uneven shape of the reflection face in accordance with the intensity distribution of the first laser beam $L_1$, the light intensity distribution of the second laser beam $L_2$ having a linear distribution can be uniformized. By constructing the reflection face by planes, there is an advantage such that designing for uniformizing the light intensity distribution is facilitated.

Desirably, the angle of the reflection face of the first reflecting unit 16 with respect to the incidence direction of the first laser beam $L_1$ is 45±5 degrees. As a result, the second laser beam $L_2$ obtained by bending the first laser beam $L_1$ at an almost right angle can be obtained.

Further, the liquid crystal display device 100 has a second reflecting unit 22 for reflecting the second laser beam $L_2$ to form a third laser beam $L_3$ having a two-dimensionally spread distribution, that is, a planar distribution or a planar shape. The second reflecting unit 22 is constructed by a second reflector 24 having a reflection face and a second transparent unit 26 provided on the reflection face of the second reflector 24. The second reflector 24 has a width which is almost the same as length in a longitudinal direction of the first reflector 18 and expands in the emission direction of the second laser beam $L_2$. The second laser beam $L_2$ is reflected by the second reflecting unit 22 while maintaining the wavelength and polarization to become the third laser beam $L_3$.

The material of the second reflector 24 is, for example, molded glass, and the surface on which the second laser beam $L_2$ falls is a reflection face coated with a metal having high reflectance to the second laser beam $L_2$ such as Al or Ag. The material of the second reflector 24 is not limited to glass but may be a resin or metal.

A single-layer or multi-layer dielectric film for increasing the reflectance may be formed by vapor deposition or the like on the surface of the reflector. The optical thickness of the dielectric film is desirably $m\lambda/4n$ when the wavelength of the second laser beam $L_2$ is $\lambda$ from the viewpoint of increasing the reflectance. "m" denotes an integer, and "n" denotes a refractive index of the dielectric film.

The second transparent unit 26 is, for example, a transparent glass made of a transparent resin, quartz, or the like and is processed so as to be fit to the reflection face of the second reflector 24. The end face on the second reflector 24 side of the second transparent unit 26 is subjected to non-reflection coating for the wavelength of the second laser beam $L_2$ in order to suppress the light quantity loss by surface reflection. Alternatively, the end face is desirably tilted with respect to the second laser beam $L_2$ so that the angle becomes the Brewster's angle.

Preferably, the second transparent unit 26 assures the intensity of the second reflecting unit 22 and, from the viewpoint of facilitating manufacture, the second transparent unit 26 exists. From the viewpoint of optical characteristics, the second transparent unit 26 is not always an essential component, and the reflection face side of the second reflecting unit 22 may be gas such as air.

Figure 3:
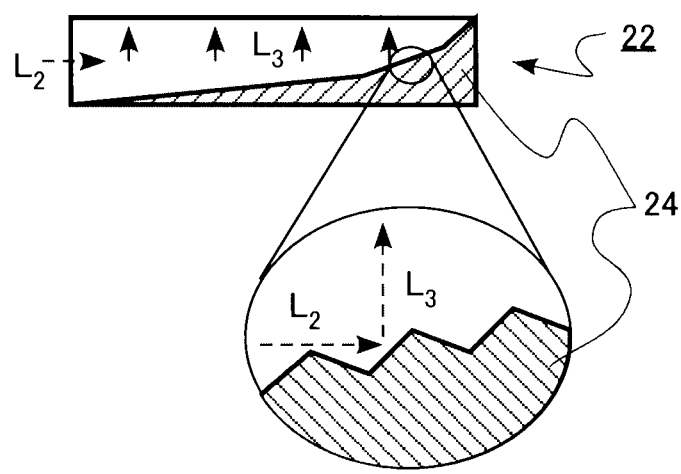
FIG. 3 is a partly enlarged view of a portion around a reflection face of a second reflector in the first embodiment.

FIG. 3 is a partly enlarged view of a portion around the reflection face of the second reflector in the embodiment. The reflection face of the reflector 22 is desirably formed by combination of planes and has, for example, an uneven shape such as a triangle as shown in FIG. 3. By optimizing the uneven shape of the reflection face in accordance with the intensity distribution of the second laser beam $L_2$, the light intensity distribution of the third laser beam $L_3$ having a planar distribution can be uniformized. By constructing the reflection face by planes, there is an advantage such that designing for uniformizing the light intensity distribution is facilitated.

Desirably, the angle of the reflection face of the second reflecting unit 22 with respect to the incidence direction of the second laser beam $L_2$ is 45±5 degrees. As a result, the third laser beam $L_3$ obtained by bending the second laser beam $L_2$ at an almost right angle can be obtained.

The first and second reflecting units 16 and 22 may be in contact with each other as shown in FIG. 1A or may be apart from each other. They may be an integrated unit, not different units.

Further, the liquid crystal display device 100 has a optical switch 28 using liquid crystal on which the third laser beam $L_3$ is incident on the top face side of the second reflecting unit 22 as shown in FIG. 1C. The liquid crystal optical switch 28 modulates the intensity of outgoing light from incident light by using the liquid crystal. For example, by controlling orientation of liquid crystal provided between two polarizers which are orthogonal to each other in the polarization direction, the on/off state of the emitting light is controlled.

In the embodiment, the polarization of the third laser beam $L_3$ is maintained. Consequently, for example, by aligning the polarization directions of the polarizers on the incidence side of the liquid crystal optical switch 28 in the polarization direction of the third laser beam $L_3$, the light quantity loss by the polarizer at the time of incidence of the liquid crystal optical switch 28 can be made extremely small.

A first scattering unit 30 on which the third laser beam $L_3$ passed through the liquid crystal optical switch 28 falls and which generates scattered light is provided on the top face of the liquid crystal optical switch 28. In the embodiment, the first scattering unit 30 is a phosphor which emits fluorescent light using the third laser beam $L_3$ as excitation light.

Figure 4A:
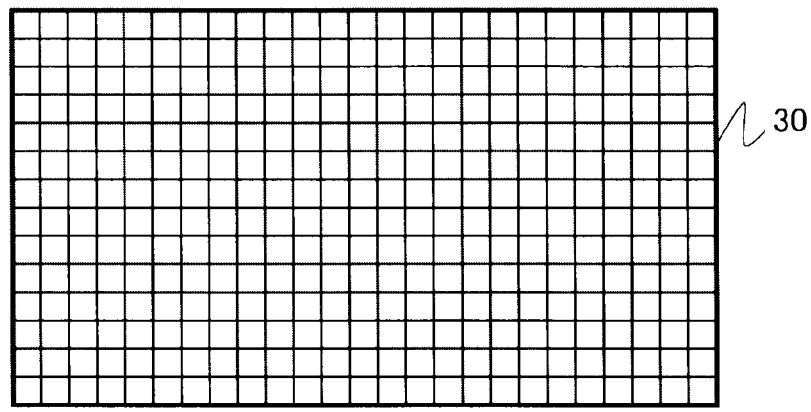
FIGS. 4A to 4C are schematic diagrams of a liquid crystal optical switch and a first scattering unit of the first embodiment.
Figure 4B:
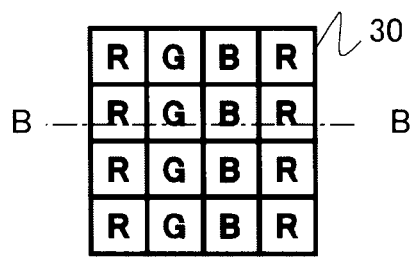
Figure 4C:
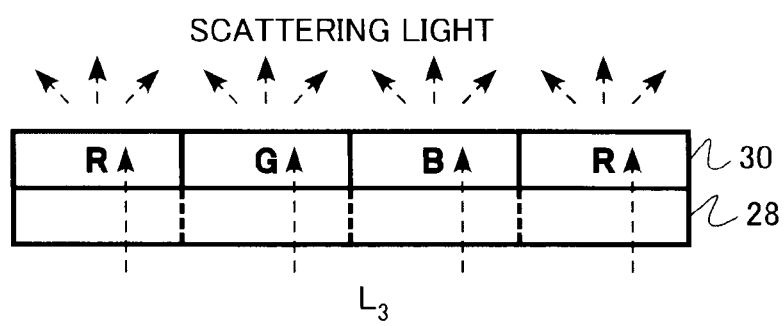

FIGS. 4A to 4C are schematic diagrams of the liquid crystal optical switch and the first scattering unit of the embodiment. FIG. 4A is a schematic top view of a phosphor as the first scattering unit, FIG. 4B is a schematic top view of a part of the phosphor as the first scattering unit, and FIG. 4C is a schematic cross section taken along B-B of FIG. 4B.

As shown in FIG. 4A, the first scattering unit 30 provided on the top face side of the second reflecting unit 22, that is, the display face side of the liquid crystal display device 100 is divided on the pixel unit basis. As shown in FIG. 4B, red phosphors (R) emitting red, green phosphors (G) emitting green, and blue phosphors (B) emitting blue when they are excited with ultraviolet light having a wavelength 400 nm are formed in the divided pixels. Concretely, for example, the red phosphor (R) is an LOS-based phosphor, the green phosphor (G) is a SOSE-based phosphor, and the blue phosphor (B) is an apatite-based phosphor. For example, particles of the phosphors are encapsulate in resins and disposed in the pixels. In other words, the first scattering unit is made by a plurality of phosphors, and the plurality of phosphors includes the red phosphor, the green phosphor, and the blue phosphor.

The liquid crystal optical switch 28 is constructed so that emission light can be on/off controlled on the pixel unit basis. That is, the liquid crystal optical switch 28 is constructed to control passage and blocking of the third laser beam. The third laser beam $L_3$ passed through the liquid crystal optical switch 28 is incident as excitation light on each of the phosphors, and the phosphor is excited and emits scattering light of a predetermined color. By emitting the scattering light, a predetermined view angle required for the display device can be also assured.

Since all of the light quantity (amount) is used without selecting the wavelength of light by using a color filter, the light quantity loss accompanying display of colors can be made extremely small.

The luminescent quantum efficiency of the phosphors varies according to the kinds of the phosphors. Therefore, by setting the size of a pixel in accordance with the quantum efficiency of a phosphor, or mixing a transparent scattering unit with the phosphor while the size of the pixel is left constant, the light emission intensity among the pixels can be adjusted.

By adding a phosphor which is excited by ultraviolet light having a wavelength of 400 nm and emits cyan color or yellow and constructing the first scattering unit 30 by the phosphors of four colors, the displayable color range can be also enlarged.

According to the embodiment, a laser beam emitted from the semiconductor laser diode as a light source can be transmitted to the liquid crystal optical switch as a laser beam having a planar distribution while maintaining polarization. Therefore, the light quantity loss in the polarizer of the liquid crystal optical switch can be made extremely small. By using the phosphors, there is no selection of light using color filters accompanying display of colors, so that the light quantity loss can be also made extremely small. In addition, by using two reflecting units, the depth direction of the display screen can be reduced.

Although the case of using ultraviolet light as the light source and using, as the first scattering unit, the red phosphor (R), the green phosphor (G), and the blue phosphor (B) has been described as an example in the embodiment, for example, the configuration of using the blue laser beam as the light source and using, as the first scattering unit, the red phosphor (R) and the green phosphor (G) can be also employed.

Second Embodiment

A liquid crystal display device of a second embodiment is similar to that of the first embodiment except that a second scattering unit containing a plurality of transparent particles is provided between the semiconductor laser diode and the liquid crystal optical switch and, in the case where wavelength of first, second, and third laser beams is set as $\lambda$ and average particle diameter of the plurality of transparent particles is D, $0.2\lambda \leq D \leq \lambda$ is satisfied. Therefore, content overlapping that of the first embodiment will not be described.

Figure 5:
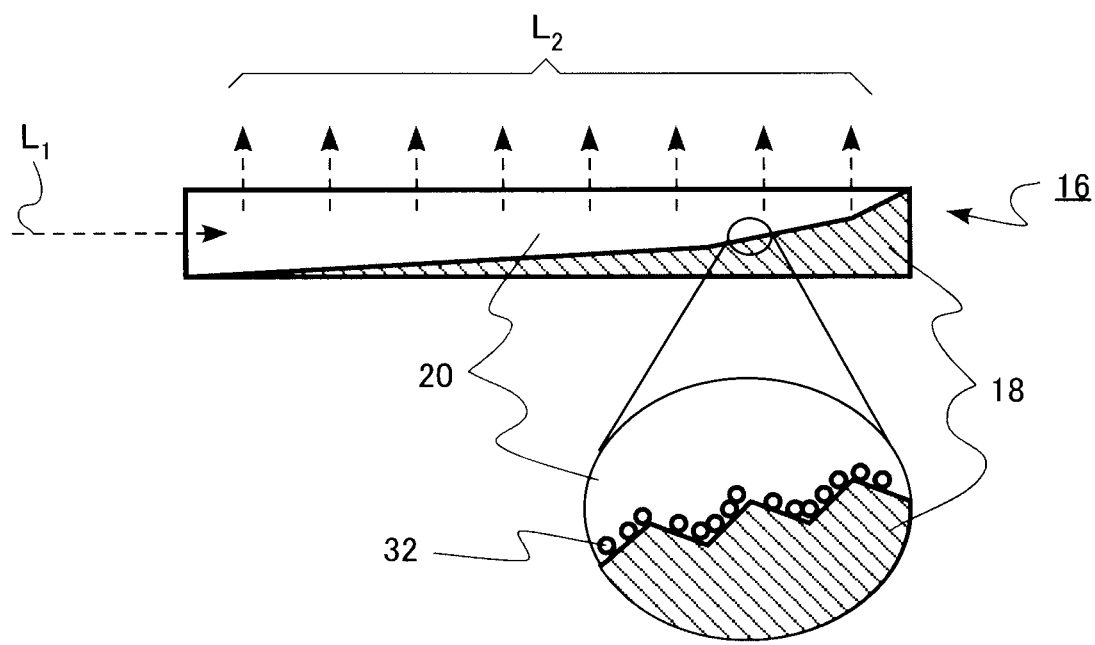
FIG. 5 is a partly enlarged view of a portion around a reflection face of the first reflector of a second embodiment.

FIG. 5 is a partly enlarged view of a portion around the reflection face of the first reflector of the second embodiment. In a region corresponding to the first reflector 18 side, in the first transparent unit 20, a plurality of transparent particles 32 having a refractive index different from that of the main material of the first transparent unit 20 are contained. In the example, the first transparent unit 20 corresponds to the second scattering unit. Since the refractive index of the transparent particles is different from that of the periphery, the laser beam can be scattered.

In the case where the average particle diameter of the transparent particles 32 is D, when the wavelength of the first and second laser beams is $\lambda$, $0.2\lambda \leq D \leq \lambda$, is satisfied. The average particle diameter means a value obtained by calculating average values of the minor diameter and the major diameter of transparent particles and, further averaging the average values with respect to a plurality of transparent particles.

For example, the first transparent unit 20 is a transparent resin, and the transparent particles 32 are particles of quartz glass having a sphere shape.

Figure 6:
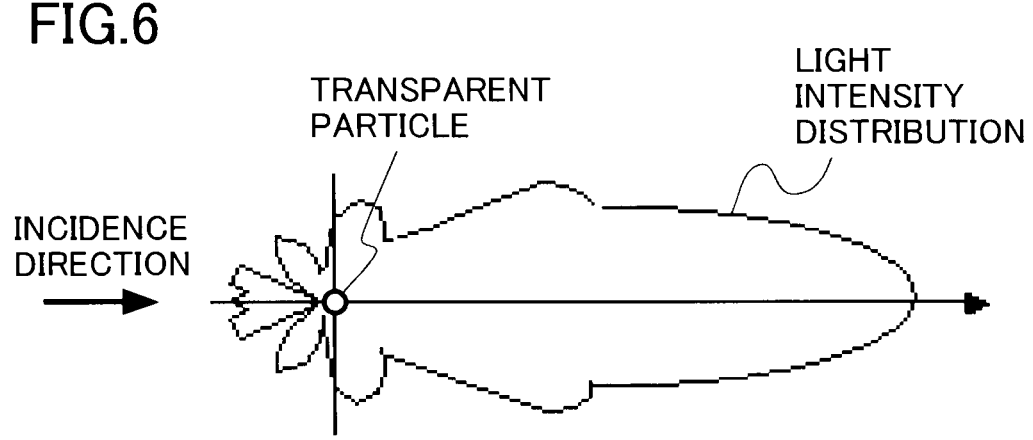
FIG. 6 is a diagram showing a simulation result of a light intensity distribution of laser beam scattering by a transparent particle in the second embodiment.

FIG. 6 is a diagram showing a simulation result of a light intensity distribution of laser beam scattering by a transparent particle. As shown in FIG. 6, when the average particle diameter lies in the above range, light is scattered at an angle of about ±5 degrees from the direction same as the incidence direction.

At this time, the polarization direction of the scattering light also slightly tilts. The tilt is about ±5 degrees and an increase in the light quantity loss caused by the polarizer when light passes through the liquid crystal optical switch 28 is not large.

Figure 7:
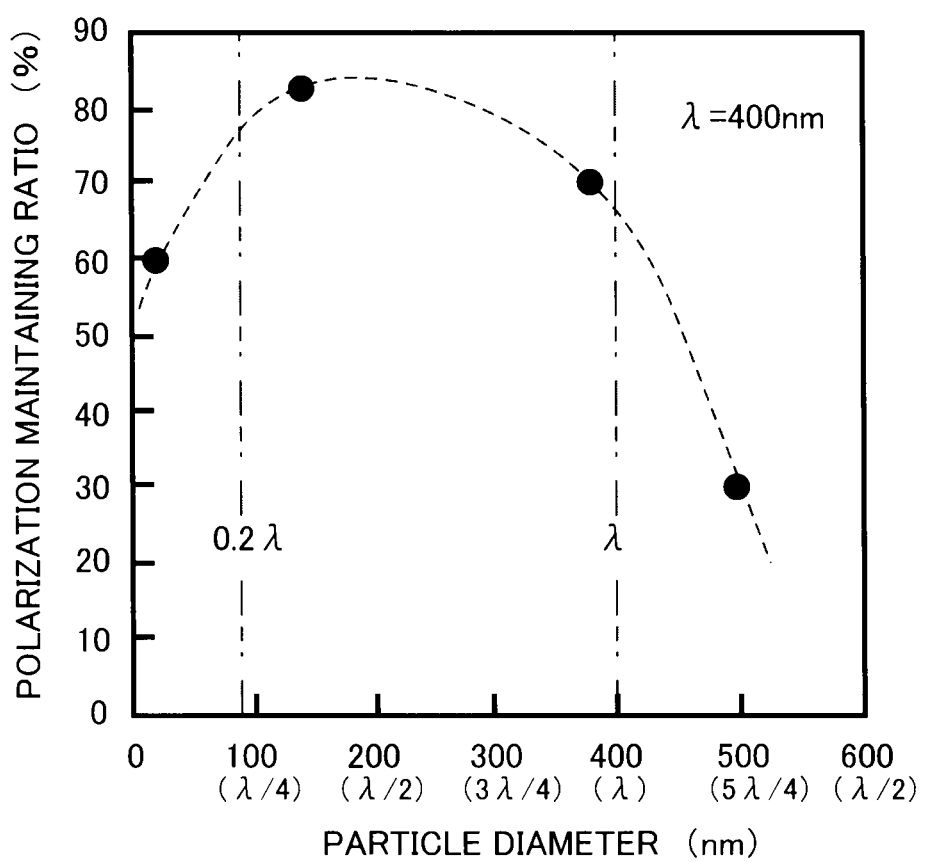
FIG. 7 is a diagram showing the diameter of a transparent particle and the polarization maintaining ratio of scattering light in the second embodiment.

FIG. 7 is a diagram showing the diameter of a transparent particle and the polarization maintaining ratio of scattering light. The diagram shows the result of simulation using the diameters of the transparent particles as parameters in the case where the wavelength $\lambda$ is 400 nm.

In the case where the quantity S of light having a first polarization angle enters, the light quantity having the same polarization angle as the first polarization angle after scattered by the transparent particle is set as S1, and the light quantity having a second polarization angle orthogonal to the first polarization angle is set as S2, the polarization maintaining ratio is a value obtained by calculating the following.

Polarization maintaining ratio=((S1−S2)/S+1)/2

As obvious from FIG. 7, when the average particle diameter is D, when $0.2\lambda \leq D \leq \lambda$ is satisfied, the polarization maintaining ratio becomes 60% or higher, and the light quantity loss is suppressed to be low. Further, when $0.2\lambda \leq D \leq 0.8\lambda$, is satisfied, it is more desirable since the polarization maintaining ratio of 70% or higher can be assured.

In the case of employing the configuration of transmitting a laser beam to the liquid crystal optical switch by using two reflecting units while maintaining polarization like in the embodiment, to maintain the light use efficiency, accurate positioning of the units is required. By providing the second scattering unit containing the plurality of transparent particles 32 like in the embodiment, the laser beam is scattered while maintaining polarization. Therefore, the margin of formation and assembly of the units can be made wide. Therefore, the liquid crystal display device which is easily designed and easily manufactured can be realized.

In the case where a reflection face of the first reflecting unit 16 is formed by combination of planes as shown in FIG. 2, a dark part of reflection light is created in the uneven shape, and there is the case where uniformity of the light intensity distribution of the second laser beam $L_2$ deteriorates. By providing the second scattering unit like in the embodiment, the first laser beam $L_1$ and the second laser beam $L_2$ are scattered. Consequently, there is also an advantage that the uniformity of the light intensity distribution of the second laser beam $L_2$ improves.

The configuration that the plurality of transparent particles 32 are contained in the region corresponding to the first reflector 18 side, of the first transparent unit 20 is desirable from the viewpoint of easily manufacturing the first transparent unit 20 by, for example, a method of making the transparent particles 32 settled in a resin. The invention, however, can be also applied to the configuration that the transparent particles 32 are uniformly dispersed in the first transparent unit 20.

In place of the first transparent unit 20, a second scattering unit may be employed by making transparent particles contained in the second transparent unit 26 like in the first transparent unit 20. It is also possible to make transparent particles contained in both of the first and second transparent units 20 and 26 and employ both of the units as the second scattering units.

Different from the first and second transparent units 20 and 26, a unit containing a plurality of transparent particles may be provided as the second scattering unit. For example, transparent particles may be dispersed or applied on the reflection face of the first and second reflectors 18 and 24.

Although the case where the transparent particle has a spherical shape has been described as an example, for example, a spindle-shaped particle is used as the transparent particle and disposed so that the longitudinal direction of the particle is parallel to the polarization direction of the laser beam. The polarization maintaining ratio is further improved, and it is desirable.

Third Embodiment

A liquid crystal display device of a third embodiment is similar to that of the first embodiment except that a semiconductor laser diode which emits visible light not ultraviolet light is applied, and a colorless or transparent diffuser, not phosphors, is used as the first scattering unit.

According to the third embodiment, a liquid crystal display device of single color with reduced power consumption of the device can be realized.

Fourth Embodiment

A liquid crystal display device of a fourth embodiment is similar to that of the first embodiment except that three semiconductor laser diodes for emitting laser beams of red, green, and blue are provided as a light source, and a colorless or transparent diffuser, not phosphors, is used as the first scattering unit.

Figure 8A:
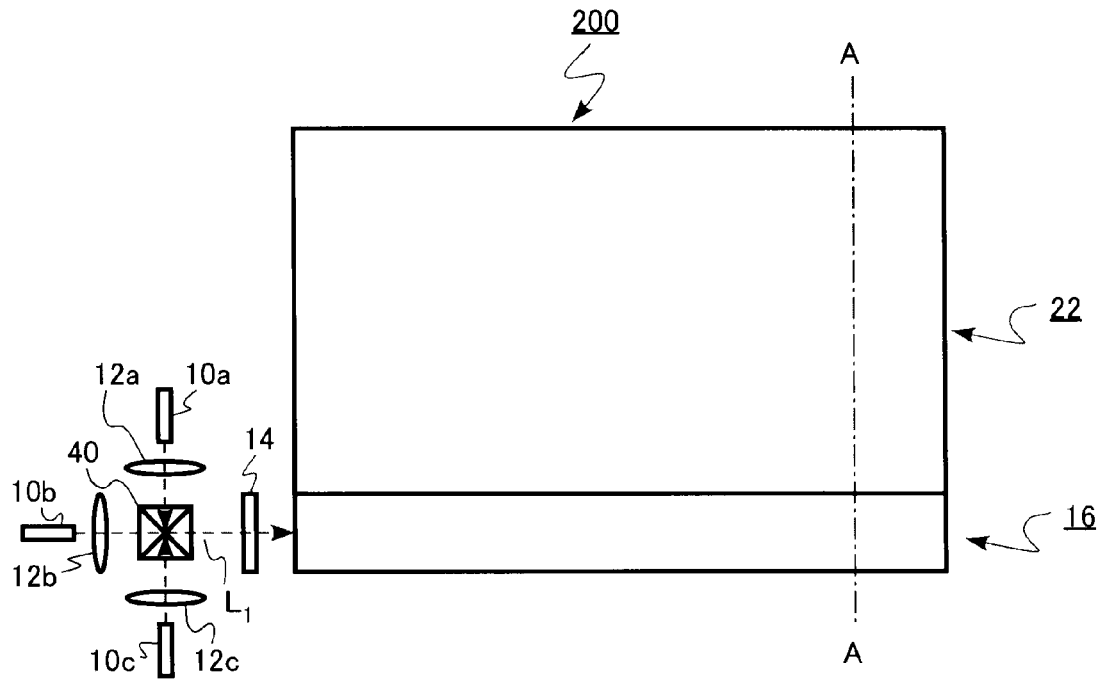
FIGS. 8A to 8C are schematic diagrams of a liquid crystal display device of a fourth embodiment.
Figure 8B:
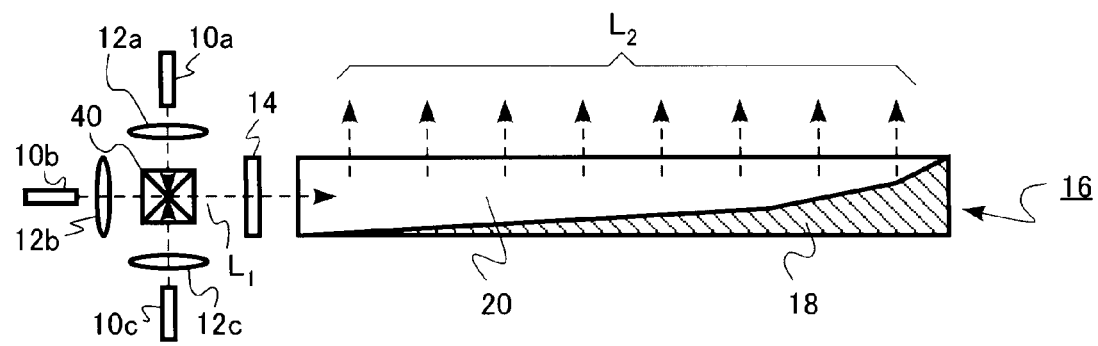
Figure 8C:
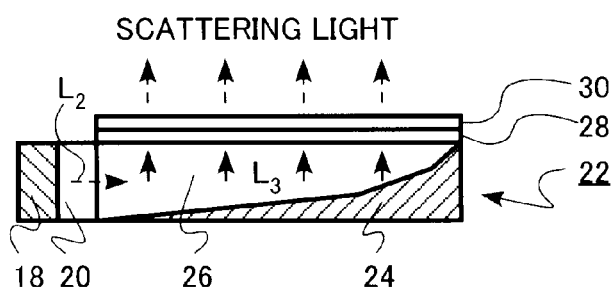

FIGS. 8A to 8C are schematic diagrams of the liquid crystal display device of the embodiment. FIG. 8A is a schematic top view of the liquid crystal display device, FIG. 8B is a schematic cross section of a plane parallel to the top view of FIG. 8A of the first reflecting unit and the like, and FIG. 8C is a schematic cross section taken along line A-A of FIG. 8A.

As shown in FIG. 8, a liquid crystal display device 200 of the embodiment has a first semiconductor laser diode 10a for emitting a laser beam of red, a second semiconductor laser diode 10b for emitting a laser beam of green, and a third semiconductor laser diode 10c for emitting a laser beam of blue. The liquid crystal display device 200 also has collimator lenses 12a, 12b, and 12c corresponding to the first, second, and third semiconductor laser diodes, respectively, and a prism 40 for changing the optical path.

The first scattering unit 30 is a transparent or colorless diffuser. The first scattering unit 30 scatters the third laser beam $L_3$ which passes through the liquid crystal optical switch 28, thereby loosing coherency, assuring safety, and realizing a predetermined view angle required for the display device.

The liquid crystal display device 200 of the embodiment switches the colors of laser beams in time series to emit a first laser beam $L_1$. Consequently, a pixel configuration of three colors of red, green, and blue can be realized on a display screen.

While certain embodiments have been described, these embodiments have been presented by way of example only, and are not intended to limit the scope of the inventions. Indeed, the liquid crystal display device described herein may be embodied in a variety of other forms; furthermore, various omission, substitutions and changes in the form of the devices and methods described herein may be made without departing from the spirit of the inventions. The accompanying claims and their equivalents are intended to cover such forms or modifications as would fall within the scope and spirit of the inventions.

For example, when only light around the center axis of laser beams emitted from the semiconductor laser diode is used, the collimator lens and the diffraction grating may not be provided.

What is claimed is:

1. A liquid crystal display device comprising:
   a semiconductor laser diode emitting a first laser beam;
   a first reflecting unit configured to reflect the first laser beam and form a second laser beam having a one-dimensionally spread distribution;
   a second reflecting unit configured to reflect the second laser beam and form a third laser beam having a two-dimensionally spread distribution;
   an optical switch using liquid crystal, the optical switch being configured to control passage and blocking of the third laser beam;
   a first scattering unit scattering the third laser beam passed through the optical switch; and
   a second scattering unit having a plurality of transparent particles, the second scattering unit being placed between the semiconductor laser diode and the optical switch,
   wherein an average particle diameter D of the plurality of transparent particles satisfies $0.2\lambda \leq D \leq \lambda$, where $\lambda$ is a wavelength of the first laser beam.

2. The device according to claim 1, wherein a reflection face of each of the first and second reflecting units is formed by a combination of planes.

3. The device according to claim 1, wherein the first scattering unit is made of a phosphor.

4. The device according to claim 1, wherein the first, second, and third laser beams are ultraviolet light, the first scattering unit includes a plurality of phosphors, and the plurality of phosphors includes a red phosphor, a green phosphor, and a blue phosphor.

5. The device according to claim 1, further comprising, a collimator lens and a diffraction grating, the collimator lens and the diffraction grating being placed between the semiconductor laser diode and the first reflecting unit.

6. The device according to claim 1, wherein each of an angle of a reflection face of the first reflecting unit with respect to an incidence direction of the first laser beam and an angle of a reflection face of the second reflecting unit with respect to an incidence direction of the second laser beam is 45±5 degrees.

7. The device according to claim 1, wherein a reflection face of each of the first and second reflecting units has an uneven shape formed by a combination of planes.

8. The device according to claim 1, wherein a reflection face of each of the first and second reflecting units has an uneven shape formed by a combination of planes.

9. The device according to claim 8, wherein the first scattering unit is made of a phosphor.

10. A liquid crystal display device comprising:
a semiconductor laser diode emitting a first laser beam;
a first reflecting unit including a first reflector expanding in an emission direction of the first laser beam, the first reflector reflecting the first laser beam to form a linear shaped second laser beam;
a second reflecting unit having a width substantially equal to a length in a longitudinal direction of the first reflector, the second reflecting unit including a second reflector expanding in an emission direction of the second laser beam, the second reflector reflecting the second laser beam to form a plane shaped third laser beam;
an optical switch using liquid crystal, the optical switch being configured to control passage and blocking of the third laser beam; and
a first scattering unit scattering the third laser beam passed through the optical switch; and
a second scattering unit having a plurality of transparent particles, the second scattering unit being placed between the semiconductor laser diode and the optical switch,
wherein an average particle diameter D of the plurality of transparent particles satisfies $0.2\lambda \leq D \leq \lambda$, where $\lambda$ is a wavelength of the first laser beam.

11. The device according to claim 10, wherein a reflection face of each of the first and second reflecting units is formed by a combination of planes.

12. The device according to claim 10, wherein the first scattering unit is made of a phosphor.

13. The device according to claim 10, wherein the first, second, and third laser beams are ultraviolet light, the first scattering unit includes a plurality of phosphors, and the plurality of phosphors includes a red phosphor, a green phosphor, and a blue phosphor.

14. The device according to claim 10, further comprising, a collimator lens and a diffraction grating, the collimator lens and the diffraction grating being placed between the semiconductor laser diode and the first reflecting unit.

15. The device according to claim 10, wherein each of an angle of a reflection face of the first reflecting unit with respect to an incidence direction of the first laser beam and an angle of a reflection face of the second reflecting unit with respect to an incidence direction of the second laser beam is 45±5 degrees.

16. The device according to claim 10, wherein a reflection face of each of the first and second reflecting units has an uneven shape formed by a combination of planes.

17. The device according to claim 10, wherein a reflection face of each of the first and second reflecting units has an uneven shape formed by a combination of planes.

18. The device according to claim 17, wherein the first scattering unit is made of a phosphor.

19. The device according to claim 1, wherein the plurality of transparent particles are included in a transparent glass or a transparent resin, the particles having a refractive index different from that of the transparent glass or the transparent resin.

20. The device according to claim 19, wherein
the second scattering unit is formed on a reflection face of the first reflecting unit or a reflection face of the second reflecting unit, and the particles are clustered along the reflection face of the first reflecting unit or the reflection face of the second reflecting unit.

21. The device according to claim 10, wherein the plurality of transparent particles are included in a transparent glass or a transparent resin, the particles having a refractive index different from that of the transparent glass or the transparent resin.

22. The device according to claim 21, wherein
the second scattering unit is formed on a reflection face of the first reflecting unit or a reflection face of the second reflecting unit, and the particles are clustered along the reflection face of the first reflecting unit or the reflection face of the second reflecting unit.

* * * * *